(12) United States Patent
Rust et al.

(10) Patent No.: US 7,085,857 B2
(45) Date of Patent: Aug. 1, 2006

(54) IDENTIFIER MODULE INTEGRITY

(75) Inventors: Robert A. Rust, Boise, ID (US); James P. Slupe, Caldwell, ID (US); Patrick F. Donnelly, III, Star, ID (US); Richard G. Sevier, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 593 days.

(21) Appl. No.: 10/293,449

(22) Filed: Nov. 13, 2002

(65) Prior Publication Data
US 2004/0107379 A1 Jun. 3, 2004

(51) Int. Cl.
G06F 3/00 (2006.01)
G06F 1/26 (2006.01)

(52) U.S. Cl. .............. 710/13; 710/8; 710/13; 326/8; 726/34; 726/35

(58) Field of Classification Search .......... 710/7, 710/8, 13; 326/8; 726/34, 35
See application file for complete search history.

(56) References Cited

U.S. PATENT DOCUMENTS

| | | | | |
|---|---|---|---|---|
| 3,882,323 A | * | 5/1975 | Smolker | 327/525 |
| 4,268,911 A | * | 5/1981 | Bell | 365/104 |
| 5,579,487 A | * | 11/1996 | Meyerson et al. | 710/100 |
| 5,964,855 A | * | 10/1999 | Bass et al. | 710/302 |
| 6,078,968 A | * | 6/2000 | Lo et al. | 710/5 |
| 6,341,323 B1 | * | 1/2002 | Kondo et al. | 710/305 |
| 6,732,202 B1 | * | 5/2004 | Ying | 710/62 |
| 6,912,606 B1 | * | 6/2005 | Fay | 710/64 |
| 2001/0036027 A1 | * | 11/2001 | Min et al. | 360/31 |

* cited by examiner

Primary Examiner—Fritz Fleming
Assistant Examiner—M. Farooq

(57) ABSTRACT

Methods, systems, apparatuses, and arrangements enable an identifier module of a storage system to be rendered unusable upon removal from the storage system. In an exemplary identifier module implementation, the identifier module includes an identifier data space that is capable of receiving an identifier and a breakable apparatus that is adapted to break and render the identifier module unusable upon removal of the identifier module from a storage system. The identifier module may be adapted for removable attachment to the storage system. In an exemplary storage system implementation, the storage system includes one or more memory units that are capable of storing information and at least one interface that is adapted to receive an identifier module. The at least one interface includes a disrupter apparatus that is adapted to break and render unusable an identifier module upon removal of such an identifier module from the at least one interface.

65 Claims, 6 Drawing Sheets

IDENTIFIER MODULE INTEGRITY

TECHNICAL FIELD

This disclosure relates in general to the field of information processing systems, and in particular, by way of example but not limitation, to enabling the on-line repair of identifier modules in highly-reliable storage systems of information processing systems.

BACKGROUND

Internet commerce companies, and increasingly businesses in general, entrust their business-critical information to highly-reliable information processing systems. These information processing systems typically include arrays of disk drives that store the business-critical information. These disk drives are also designed to be highly reliable. In an information processing system, a computer usually processes the business-critical information while in communication with the disk drives over a coupling such as a network. In order to communicate with the disk drives over the network, the disk drives have traditionally been identified using a network address or similar.

SUMMARY

Methods, systems, apparatuses, and arrangements enable an identifier module of a storage system to be rendered unusable upon removal from the storage system. In an exemplary identifier module implementation, the identifier module includes an identifier data space that is capable of receiving an identifier and a breakable apparatus that is adapted to break and render the identifier module unusable upon removal of the identifier module from a storage system. The identifier module may be adapted for removable attachment to the storage system. In an exemplary storage system implementation, the storage system includes one or more memory units that are capable of storing information and at least one interface that is adapted to receive an identifier module. The at least one interface includes a disruptor apparatus that is adapted to break and render unusable an identifier module upon removal of such an identifier module from the at least one interface. Various alternative implementations for identifier modules, identifiers, breakable apparatuses, storage systems, memory units, interfaces, disruptor apparatuses, etc. are described. Exemplary methods for building and utilizing identifier modules are also described.

BRIEF DESCRIPTION OF THE DRAWINGS

In the Drawings, like numerals are used for like and/or corresponding features, aspects, and components of the various FIGS. 1–9.

DETAILED DESCRIPTION

Figure 1:
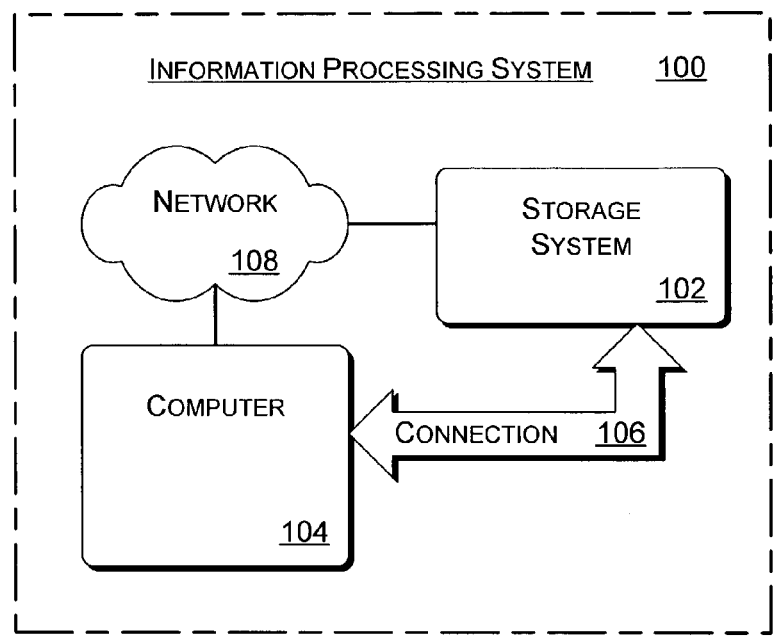
FIG. 1 illustrates an exemplary information processing system having a storage system.

FIG. 1 illustrates an exemplary information processing system 100 having a storage system 102. Information processing system 100 represents an information processing system that is, for example, highly-reliable and may be suitable for handling mission-critical information for a corporate, government, or other enterprise. However, information processing system 100 may be employed in any environment in which reliability is necessary or desirable. If intended for highly-reliable applications, information processing system 100 generally includes (i) redundancies to facilitate continued functioning even when a physical part or other aspect malfunctions and (ii) the ability to be repaired while the system remains fully or at least partially functional (e.g., on-line).

The storage system 102 may be constructed using any available memory technology. These memory technologies include magnetic disk drives, magneto-optical disk drives, solid-state memory devices such as flash memory, and so forth. However, storage system 102 is usually constructed of disk drives that are formed into an array of disk drives. Such an array may form a redundant array of independent/inexpensive disks (a RAID), a Fibre Channel storage system, and so forth. Other fast and/or reliable storage systems may alternatively be used to realize a storage system 102.

In a highly-reliable storage system 102, there is usually at least one redundant part for each part or set of parts in the system. Consequently, when a "standard" part fails, the redundant or "backup" part assumes the functions and responsibilities of the standard part. In this manner, the storage system may continue to function at some predetermined, albeit possibly reduced, level of performance. "Standard" parts and "backup" parts may be identical from a functional or specifications perspective. Which part of one or more parts is considered the "backup" may also depend on which part was most recently replaced and the backup "part" may actually be distributed excess capacity. Additionally, the standard part can typically be replaced with a new standard part while the storage system is on-line and continuing to function at some predetermined level of performance.

Information processing system 100 also includes a computer 104 that is capable of processing the information stored or to-be-stored at storage system 102. Computer 104 may be any specialized or general-purpose processing device including, but not limited to, a personal computer (PC), a mainframe computer, a workstation computer, a network of any such computers, and so forth. Computer 104 may operate under any specialized or general-purpose operating system, including but not limited to, Unix®, Microsoft Windows®, Linux®, Macintosh®, and so forth.

Computer 104 may be in communication with storage system 102 over any of one or more couplings. These couplings include one or more connections 106 and one or more networks 108. Connection 106 represents relatively direct couplings such as Universal Serial Bus (USB) connectors, Ethernet-based connectors, Bluetooth A) connectors, other (e.g., proprietary or non-proprietary) higher-speed point-to-point connectors, and so forth. Network 108 represents relatively less direct couplings such as a Local Area Network (LAN), the Internet, other (e.g., proprietary or non-proprietary) higher-speed networks, and so forth. Computer 104 is thus able to access storage system 102 over network 108 and/or connections 106.

Figure 2:
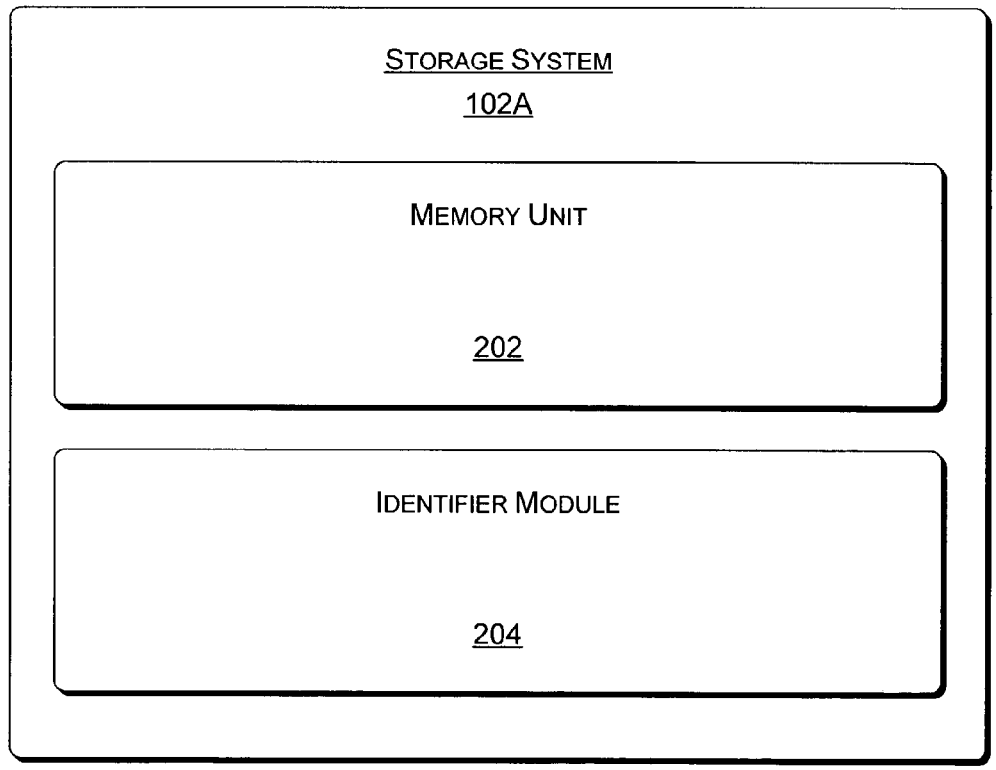
FIGS. 2–4 are exemplary storage systems illustrating memory units and identifier modules.
Figure 3:
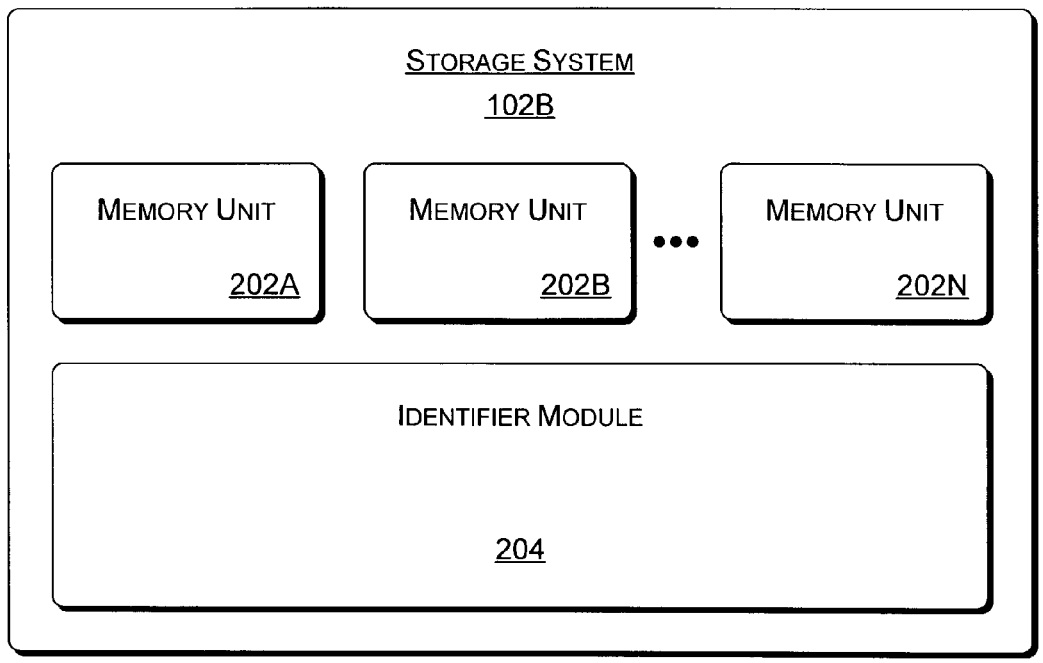
Figure 4:
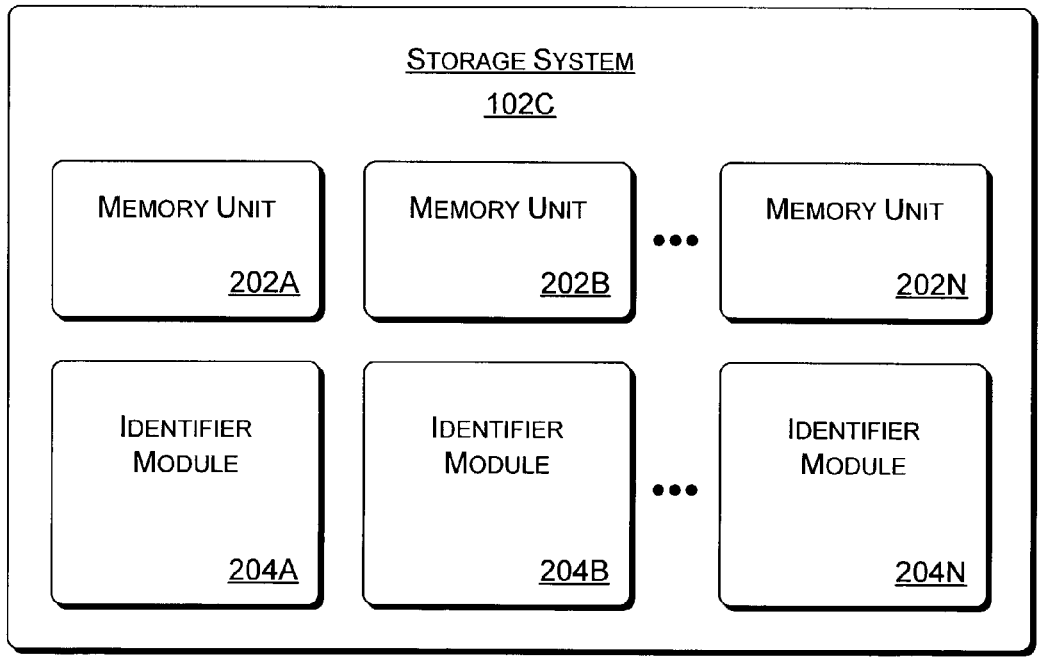

FIGS. 2–4 are exemplary storage systems 102A–102C illustrating memory units 202 and identifier modules 204. Each of storage systems 102A–102C includes one or more memory units 202 and one or more identifier modules 204. Each memory unit 202 corresponds, for example, to a subset of the memory storage capability of the storage system 102. Hence, each memory unit 202 may correspond to a disk drive or similar memory device. Each identifier module 204 includes, for example, an identifier that enables computer 104 (of FIG. 1) to locate/access/communicate with storage system 102. Identifier modules 204 may be constructed of any suitable material or materials such as metal, plastic, printed circuit board (PCB), some combination thereof, and so forth. Exemplary identifier modules 204 are described in greater detail further below, especially with reference to FIGS. 5–7.

Storage systems 102A–102C illustrate exemplary implementations of a general storage system 102. Each of storage systems 102A–102C illustrates a different combination of, and numbers of, memory units 202 and identifier modules 204. Storage system 102A includes one memory unit 202 and one identifier module 204. As such, identifier module 204 may be interfacing with and/or associated with either or both of storage system 102A and memory unit 202.

Storage system 102B includes multiple memory units 202A, 202B, . . . 202N and one identifier module 204. In this implementation, identifier module 204 is more likely to be interfacing with and/or associated with storage system 102B. Similarly, an identifier (not explicitly shown in FIG. 3) of identifier module 204 is more likely to represent the entire storage system 102B as opposed to any particular individual memory unit 202 of memory units 202A, 202B, . . . 202N.

Storage system 102C includes multiple memory units 202A, 202B, . . . 202N and multiple identifier modules 204A, 204B, . . . 204N. In this implementation, identifier modules 204A, 204B, . . . 204N are more likely to be interfacing with and/or associated with respective individual ones of memory units 202A, 202B, . . . 202N. Similarly, each identifier of identifier modules 204A, 204B, . . . 204N is more likely to represent a respective individual memory unit 202 of memory units 202A, 202B, . . . 202N as opposed to the entire storage system 102C.

For any such storage system 102, it should be understood that for each identifier module 204 that is illustrated, an un-illustrated backup/redundant identifier module 204 may be present for high-reliability purposes. Alternatively, there may be one backup/redundant identifier module 204, or at least fewer than a one-to-one correspondence of backup/redundant identifier modules 204, in each such storage system 102. Also, each identifier module 204 may be more closely associated with, and actually interfacing with, either the entire storage system 102 or an individual memory unit 202.

Figure 5:
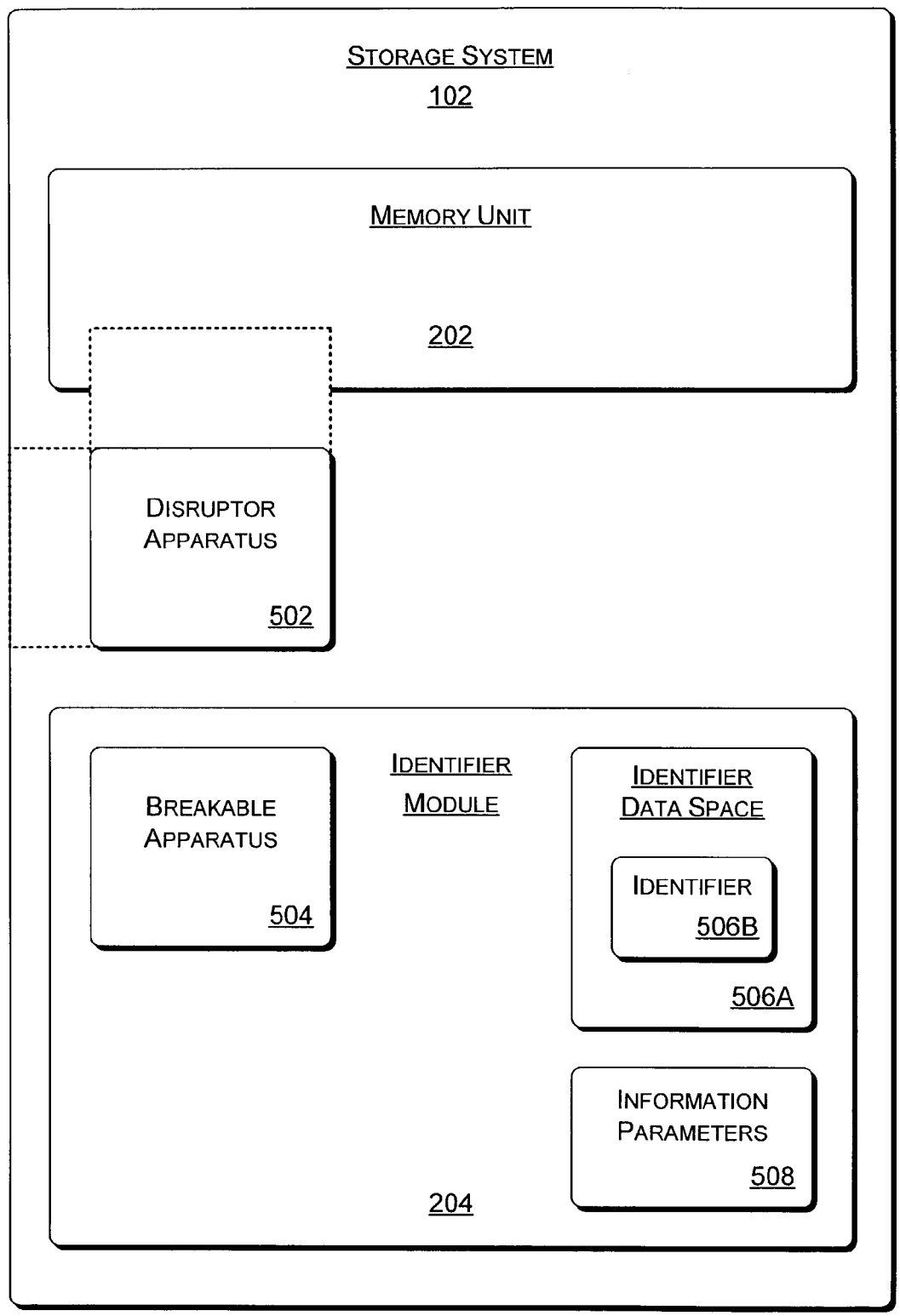
FIG. 5 is a storage system that illustrates an exemplary disruptor apparatus of the storage system and/or memory unit and an exemplary breakable apparatus of an identifier module.

FIG. 5 is a storage system 102 that illustrates an exemplary disruptor apparatus 502 of storage system 102 and/or memory unit 202 and an exemplary breakable apparatus 504 of identifier module 204. Generally, disrupter apparatus 502 acts to physically/mechanically disrupt the usability of identifier module 204 by breaking breakable apparatus 504 upon removal of identifier module 204 from storage system 102. Although not shown in FIG. 5, an interface may be used to (removably) attach identifier module 204 to storage system 102 and/or memory unit 202.

Disruptor apparatus 502 is a physical/mechanical apparatus that is adapted to render identifier module 204 unusable for its intended purpose of providing an identity to storage system 102 or a memory unit 202 thereof. Disruptor apparatus 502 may be part of and/or more closely associated with either of storage system 102 or memory unit 202, as indicated by the dashed line extending therefrom. For example, if identifier module 204 is attached to memory unit 202, then disruptor apparatus 502 may be part of memory unit 202. Alternatively, if identifier module 204 is attached to storage system 102, then disrupter apparatus 502 may be part of storage system 102. Exemplary disruptor apparatuses 502 are described further below especially with reference to FIGS. 6 and 7.

Breakable apparatus 504 is a physical/mechanical apparatus that is adapted to be broken by disruptor apparatus 502 automatically upon physical removal of identifier module 204 from storage system 102. Breaking breakable apparatus 504 renders identifier module 204 unusable for its intended purpose of being removably attached to storage system 102 and providing an identity thereto. However, even after removal, identifier module 204 may still be separately accessible for testing and diagnostic purposes. It should be noted that when an identifier module 204 is removably attached to a memory unit 202, which is physically or logically part of a storage system 102, the identifier module 204 may also be considered as attached to the storage system 102. Exemplary breakable apparatuses 504 are described further below especially with reference to FIGS. 6 and 7.

In addition to one or more breakable apparatuses 504, identifier module 204 also includes an identifier data space 506A. Identifier data space 506A is a memory location or portion that is capable of holding an identifier, such as an identifier 506B. Identifier data space 506A is realized, for example, as a writable or rewritable memory, such as flash memory, electrically programmable read-only memory (EPROM), electrically erasable PROM (EEPROM), some other non-volatile (e.g., solid state) memory, and so forth. Identifier data space 506A may also be realized as volatile random access memory (RAM), but RAM has a reduced measure of robustness. Identifier data space 506A may be incorporated into its own integrated circuit (IC) or into an IC of identifier module 204 that is also responsible for other function(s).

Identifier 506B is usable as an identity for a memory unit 202 and/or the entire storage system 102. Hence, computer 104 (of FIG. 1) may address or otherwise access storage system 102, or a unit thereof, using identifier 506B. Identifier 506B varies depending on the mechanism used to access storage system 102. Identifier 506B may be, for example, an Internet Protocol (IP) address, an Ethernet address, a proprietary network address, an address that comports with a Fibre Channel storage system (e.g., a node worldwide name (WWN)), and so forth.

Information parameters 508 represent parameters of storage system 102 (and/or units thereof) that may be used by computer 104 for accessing, optimizing, reconfiguring, etc. storage system 102. For example, for a Fibre Channel storage system, information parameters 508 may include mode page(s) of the storage system that reflect the behavior thereof. Although not specifically so illustrated in FIG. 5, information parameters 508 may include an information parameters data space for holding information parameters as well as the actual information parameters. Information parameters 508 may be incorporated into their own IC or into an IC of identifier module 204 that is also responsible for other function(s). For example, a single IC may be capable of storing both identifier 506B and information parameters 508.

Figure 6:
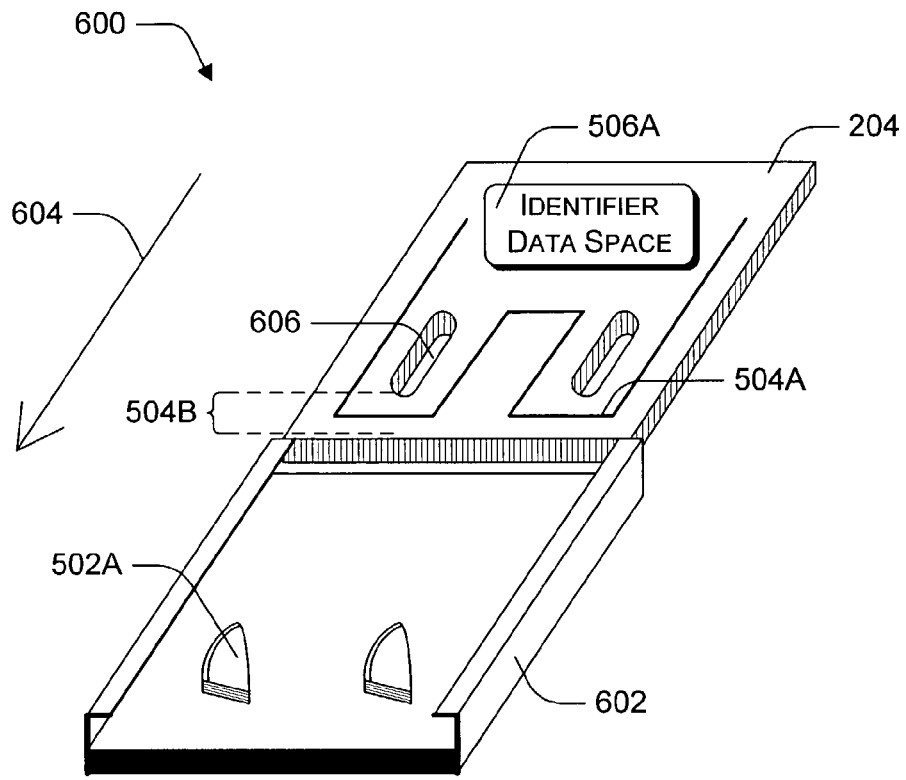
FIG. 6 illustrates an exemplary implementation of an identifier module and an interface therefor.

FIG. 6 illustrates an exemplary implementation 600 that includes an identifier module 204 and an interface 602 therefor. Interface 602 is part of, or otherwise associated with, either of storage system 102 or memory unit 202. Alternatively, interface 602 may be associated with both storage system 102 and memory unit 202, especially in an implementation such as storage system 102A (of FIG. 2). Interface 602 may be integral with or otherwise attached to either of storage system 102 or memory unit 202. In the particular implementation 600 as illustrated in FIG. 6, interface 602 comprises an insertion feature 602.

Insertion feature 602 is adapted to receive identifier module 204 via insertion, and identifier module 204 is adapted for insertion into insertion feature 602. Thus, identifier module 204 may be removably attached to insertion feature 602, and consequently storage system 102 or memory unit 202, via insertion. During installation, identifier module 204 with at least an identifier data space 506A is inserted into insertion feature 602 along the direction of arrow 604. During de-installation, identifier module 204 is removed from insertion feature 602 in the direction opposite of arrow 604. Insertion feature 602 may fully or partially enclose identifier module 204 after insertion, in which case insertion feature 602 may also be considered an enclosure.

Implementation 600 also includes a trace 504A, a portion of PCB 504B, and arms 502A. Trace 504A and portion of PCB 504B comprise exemplary breakable apparatuses 504, and arms 502A comprise exemplary disrupter apparatuses 502. However, only one such breakable apparatus 504A or 504B may be present. Furthermore, although two arms 502A are illustrated in FIG. 6, only one arm 502A (and only one corresponding breakable apparatus 504) need be present.

Trace 504A may be a critical trace. In this context, a critical trace on a substrate such as a PCB that is severed or otherwise damaged/destroyed renders identifier module 204 no longer capable of providing an identifier 506B (not explicitly shown in FIG. 6) from identifier data space 506A to or for storage system 102. Similarly, if portion of PCB 504B is ripped away or otherwise damaged/destroyed, identifier module 204 is no longer capable of providing an identifier 506B from identifier data space 506A to or for storage system 102. Identifier module 204 may become unusable from destruction of portion of PCB 504B because, for example, a critical trace is destroyed/damaged, identifier module 204 is physically unable to be properly inserted into insertion feature 602, and so forth.

Arms 502A may be constructed in any of a myriad of fashions and using various materials. For example, arms 502A may be formed from the same material as is used to make insertion feature 602, such as metal or plastic. Two exemplary designs for arms 502A are described.

For a first design, arms 502A may extend from the floor of insertion feature 602 in a rising, curving manner that points towards identifier module 204 prior to insertion. As identifier module 204 is inserted, arms 502A are deflected upward (and/or a PCB portion of identifier module 204 is deflected downward) and over critical trace 504A and into slots (e.g., gaps, notches, etc.) 606. A leading edge point that has been smoothed for each of arms 502A enables arms 502A to pass over trace 504A. However, a sharp underside and/or abrupt trailing edge of arms 502A rips or otherwise damages/destroys trace 504A when identifier module 204 is removed from insertion feature 602. The PCB of identifier module 204 may be a flex circuit to facilitate breaking of trace 504A. Also, arms 502A and/or portion of PCB 504B may be designed so that portion of PCB 504B is ripped away under this design of arms 502A during removal of identifier module 204. Ripping away of portion of PCB 504B, however, does create debris during removal of identifier module 204.

A second exemplary design for arms 502A entails their rising from the floor of insertion feature 602 such that they point away from identifier module 204 prior to insertion. Under this design, arms 502A are capable of deflecting downward into the floor of insertion feature 602 (and/or the PCB of identifier module 204 is capable of deflecting upward). Identifier module 204 may therefore be safely inserted into insertion feature 602 so that arms 502A pop up and into slots 606 because arms 502A are designed to be depressed by a movement of identifier module 204 along the direction of arrow 604. However, when identifier module 204 is removed from insertion feature 602, arms 502A do not deflect downward because they are designed to not be depressed by a movement of identifier module 204 along the direction opposite of arrow 604. Consequently, arms 502A rip out portion of PCB 504B and/or trace 504A during removal of identifier module 204.

In an implementation in which the PCB of identifier module 204 is adapted to deflect, arms 502A may be designed such that a leading edge thereof that points toward identifier module 204 prior to insertion exhibits a gentle rise. Conversely, a trailing edge of identifier module 204 that points away from identifier module 204 prior to insertion exhibits a sharp or dramatic rise (e.g., a wall) so that the PCB of identifier module 204 is not inclined to be deflected. Consequently, arms 502A deflect the PCB of identifier module 204 upward without damaging it during insertion and rip out portion of PCB 504B and/or trace 504A during removal. The interaction between (i) arms 502A and (ii) trace 504A and/or portion of PCB 504B therefore renders identifier module 204 unusable automatically upon removal of identifier module 204 from interface 602.

Figure 7:
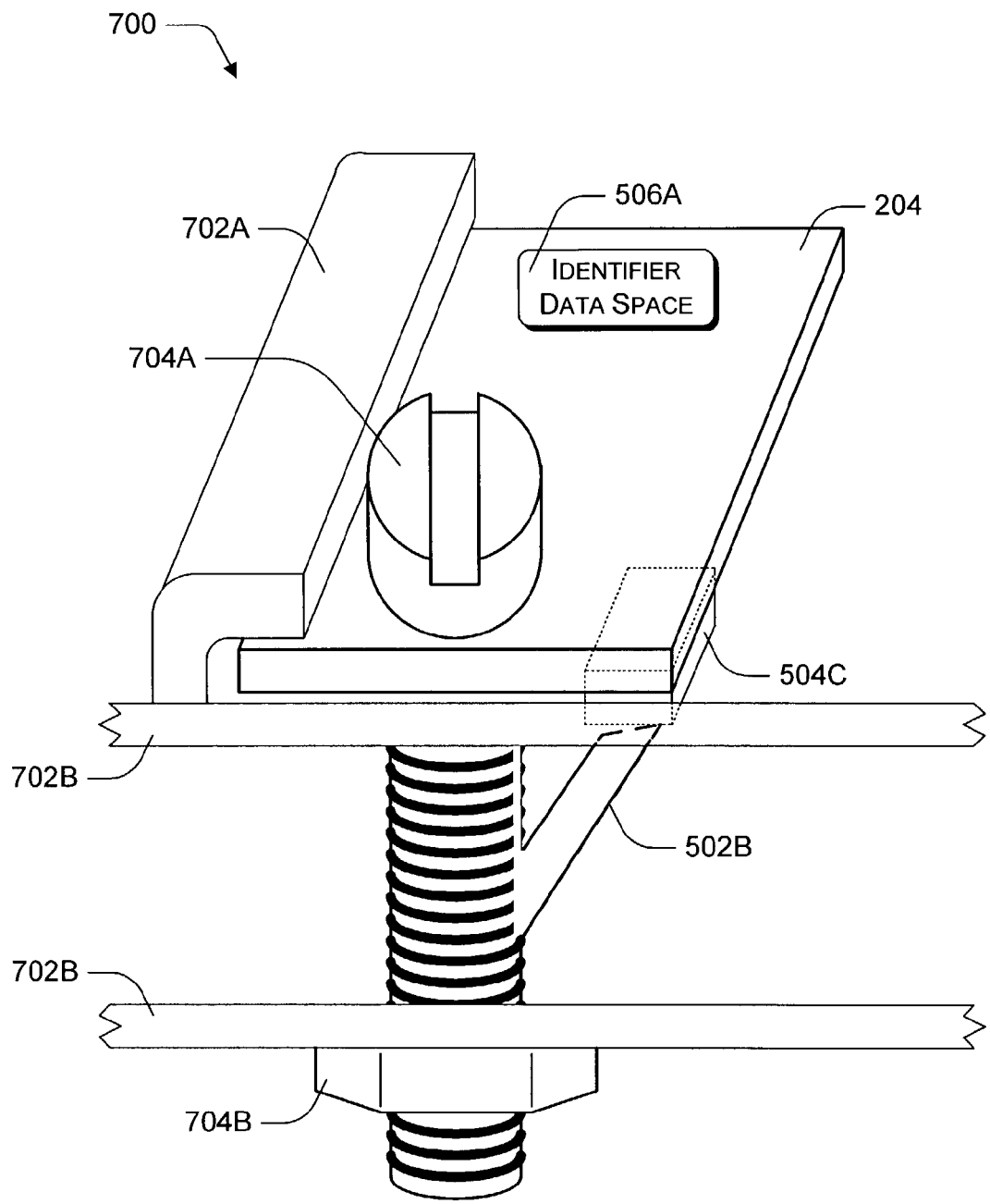
FIG. 7 illustrates another exemplary implementation of an identifier module and an interface therefor.

FIG. 7 illustrates an exemplary implementation 700 that includes an identifier module 204 and an interface 702 therefor. Interface 702 includes a restraining feature 702A and an upper and lower bulkhead 702B. Interface 702 is part of, or otherwise associated with, either of storage system 102 or memory unit 202. Alternatively, interface 702 may be associated with both storage system 102 and memory unit 202, especially in an implementation such as storage system 102A (of FIG. 2). Interface 702 may be integral with or otherwise attached to either of storage system 102 or memory unit 202. In the particular implementation 700 as illustrated in FIG. 7, interface 702 comprises a supporting feature 702.

Generally, supporting feature 702 is adapted to receive identifier module 204 and to support identifier module 204. Identifier module 204 is adapted to be supported by supporting feature 702. Specifically, identifier module 204 may be removably attached to supporting feature 702, and consequently storage system 102 or memory unit 202, via a securement using securement feature 704. Securement feature 704 includes a bolt 704A and a nut 704B. Alternatively, securement feature 704 may be a screw, a latch, or a similar implement. In some implementations, securement feature 704 may be considered as part of supporting feature 702, or more generally as part of any given interface 602/702.

During installation, identifier module 204 with at least an identifier data space 506A is supported by supporting feature 702 and secured thereto using securement feature 704. Specifically, identifier module 204 is placed under and/or against restraining feature 702A and on top of and/or against upper bulkhead 702B. Also, bolt 704A is inserted through identifier module 204 and both upper and lower bulkheads 702B. Nut 704B is placed around bolt 704A and tightened against the lower bulkhead 702B. During de-installation, the securement feature 704 is withdrawn and identifier module 204 is removed from supporting feature 702.

Implementation 700 also includes an electronic component 504C and a pawl 502B. Electronic component 504C comprises another exemplary breakable apparatus 504, and pawl 502B comprises another exemplary disruptor apparatus 502. Although only one each of electronic component 504C and pawl 502B are illustrated in FIG. 7, more than one of either or both of electronic component 504C and pawl 502B may alternatively be implemented.

Also, other types of breakable apparatuses 504 and disruptor apparatuses 502 may be implemented with any of the implementations, including those illustrated in FIGS. 5–7. Furthermore, other combinations of the illustrated breakable apparatuses 504 and disruptor apparatuses 502 may be employed. For example, a pawl 502B may be adapted to interact with (e.g., rotatably destroy/damage) a trace 504A and/or a portion of PCB 504B; also, one or more arms 502A may be adapted to interact with (e.g., damage/destroy through ripping, etc.) an electronic component 504C.

Electronic component 504C is, for example, an IC that is operational on identifier module 204. Such an IC may include identifier data space 506A, an information parameters space for information parameters 508, other functional features of identifier module 204, some combination thereof, and so forth. In this described implantation, damaging or destroying electronic component 504C, including by dislodging it, renders identifier module 204 unusable for its intended purpose. In other words, identifier module 204 is unable to provide an identifier 506B for or to a storage system 102 if electronic component 504C is damaged/destroyed. However, it may be that one or more components and/or functions of identifier module 204 are still available through a separate testing or diagnostic procedure.

In operation, bolt 704A is inserted through identifier module 204 and upper bulkhead 702B while pawl 502B is compressed into the shank of bolt 704A. After insertion, pawl 502B separates away from the shank of bolt 704A under the force of a spring or similar mechanism. Pawl 502B comes to rest against (e.g., under or on the side of) electronic component 504C. Upon withdrawal of bolt 704A, pawl 502B destroys or otherwise damages electronic component 504C, especially as bolt 704A, and consequentially pawl 502B, is rotated. Instead of resting against electronic component 504C, pawl 502B may alternatively come to rest in a different position such that electronic component 504C is nevertheless destroyed or otherwise damaged by pawl 502B as bolt 704A is withdrawn. The interaction between (i) pawl 502B and (ii) electronic component 504C therefore renders identifier module 204 unusable automatically upon removal of identifier module 204 from interface 702.

Figure 8:
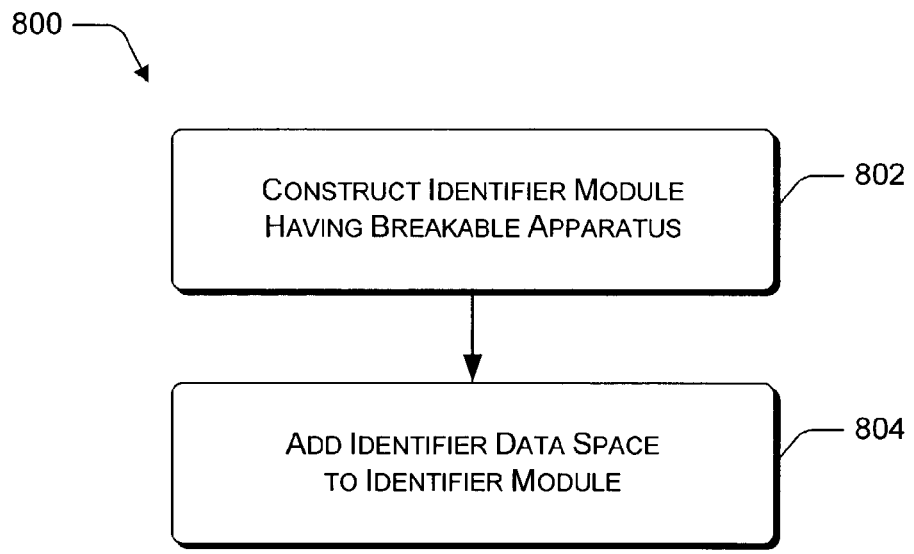
FIG. 8 is a flow diagram that illustrates an exemplary method for building an identifier module.
Figure 9:
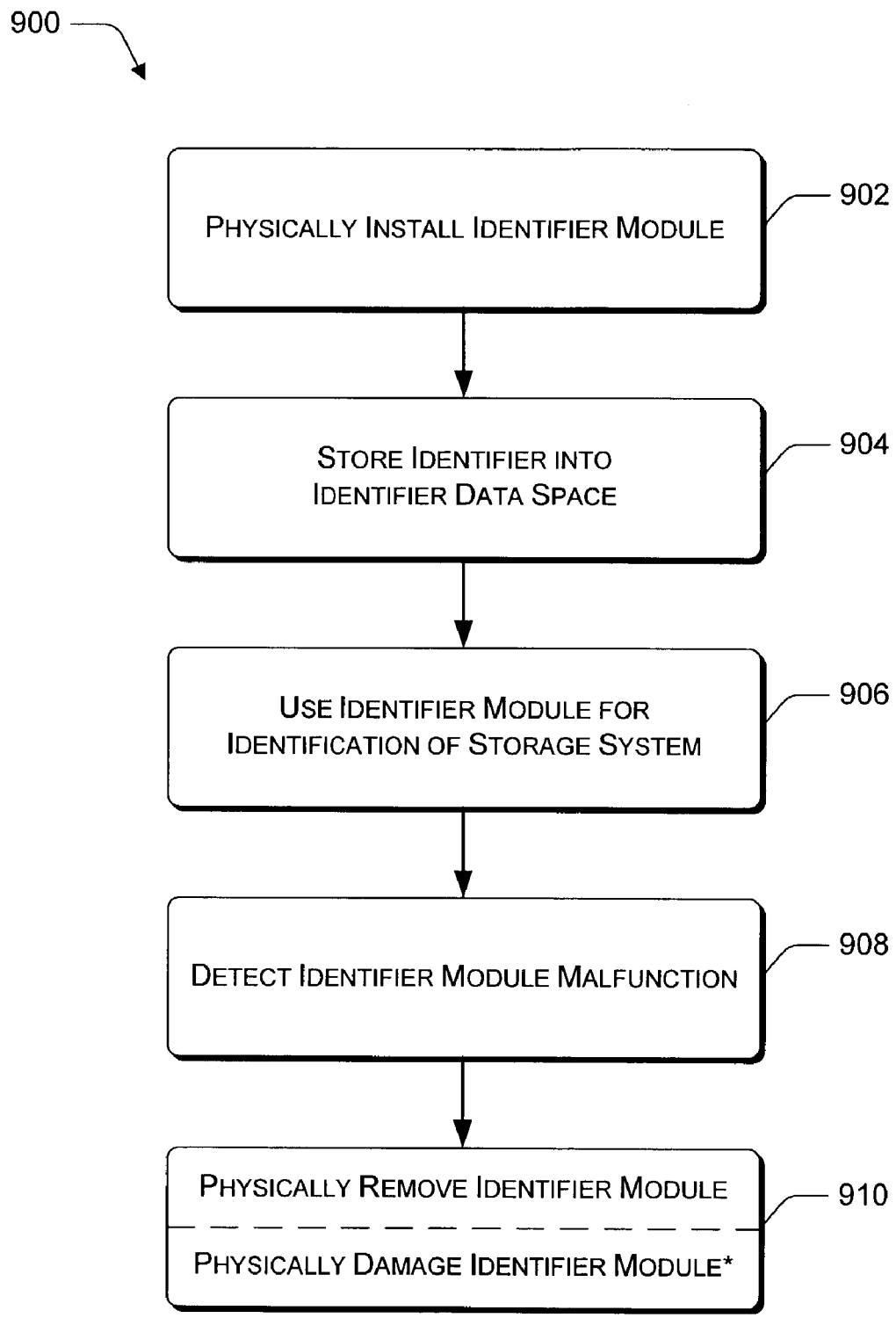
FIG. 9 is a flow diagram that illustrates an exemplary method for utilizing an identifier module.

The methods of FIGS. 8–9 are illustrated in flow diagrams that are divided into multiple method blocks. However, the order in which the methods are described is not intended to be construed as a limitation, and any number of the described method blocks can be combined in any order to implement one or more methods related to identifier module construction and use. Furthermore, although the methods of FIGS. 8–9 are described below in the context of the implementations described above with reference to FIGS. 1–7 where applicable, the methods can be implemented with any suitable apparatuses and in any configuration.

FIG. 8 is a flow diagram 800 that illustrates an exemplary method for building an identifier module. Flow diagram 800 includes two (2) method blocks 802 and 804. At block 802, an identifier module that has a breakable apparatus is constructed. For example, an identifier module 204 with a breakable apparatus 504 may be constructed using a PCB. The breakable apparatus 504 may be one or more of a trace 504A, a portion of PCB 504B, an electronic component 504C, and so forth.

At block 804, an identifier data space is added to the identifier module. For example, an identifier data space 506A may be added to the identifier module 204. This may be accomplished by soldering or otherwise connecting an IC having a memory location for an identifier 506B to the PCB. The actions of blocks 802 and 804 may be performed in a myriad of alternative manners and orders. For example, if the electronic component 504C that comprises the breakable apparatus 504 includes the identifier data space 506A, then method blocks 802 and 804 may be performed substantially simultaneously. Also, an IC that includes the identifier data space 506A may be connected to a PCB of the identifier module 204 prior to the trace 504A being applied to the PCB.

FIG. 9 is a flow diagram 900 that illustrates an exemplary method for utilizing an identifier module. Flow diagram 900 includes five (5) method blocks 902–910. Flow diagram 900 is directed to installing, using, and removing an identifier module, such as identifier module 204 as described herein, with a highly-reliable storage system that is capable of on-line repair.

When such a highly-reliable storage system is originally manufactured, two identifier modules are typically included. These two identifier modules may be considered as a "main" identifier module and a "backup/redundant" identifier module. Each of the two identifier modules may store the same unique identifier to provide an identity to the storage system. For example, in a Fibre Channel storage system, the unique identifier may comprise a node World Wide Name (WWN) identifier. Eventually, either the "main" identifier module or the "backup/redundant" identifier module may malfunction and need to be replaced. In this context, it need not matter which identifier module is considered "main" and which is considered a "backup", for either one may need to be replaced by a new identifier module while the system is on-line.

At block 902, an identifier module is physically installed. For example, an identifier module 204 may be removably attached to an interface 602/702 that is associated with an individual memory unit 202 and/or the overall storage system 102. After the identifier module 204 has been built, and prior to its attachment to a storage system, the identifier module 204 need not have an identifier 506B stored in an identifier data space 506A. Thus, any two unused identifier modules may be interchangeable and/or identical. Furthermore, unused identifier modules are unable to corrupt the integrity of an identity scheme inasmuch as they have not yet been assigned an identifier.

At block 904, an identifier is stored into an identifier data space of the identifier module. For example, an identifier 506B that is still stored in the functioning identifier module (e.g., the backup or the main identifier module) is also stored in the identifier data space 506A of the newly installed identifier module 204. Additionally, the information parameters 508 (if any) from the functioning identifier module may also be transferred, copied, etc. to the newly-installed identifier module 204. Actions for method blocks 902 and 904 may be performed while the storage system 102 is on-line.

At block 906, the identifier stored in the identifier data space of the newly-installed identifier module is used for identification of the storage system. For example, the computer 104 (of FIG. 1) may access the storage system 102 for storage and/or retrieval of information over the connections 106 and/or the networks 108 using the identifier 506B of the identifier module 204 that is stored in the identifier data space 506A.

At block 908, a malfunction in the newly-installed identifier module is detected. For example, the identifier 506B and/or the information parameters 508 may become inaccessible, damaged, corrupted, and so forth. In response, at block 910, the malfunctioning identifier module may be physically removed from the storage system. As indicated by the asterisked portion of block 910, this physical removal causes the identifier module to be automatically physically damaged/destroyed.

Such physical damage/destruction of the identifier module 204 can cause the identifier 506B to become inaccessible, can prevent re-attachment of the identifier module 204, some combination thereof, and so forth. Exemplary apparatus implementations for automatically causing such physical effects are described above. The actions of blocks 906, 908, and 910 may also be performed while the storage system is on-line. After removal of a previous identifier module, a new identifier module may be installed as described above beginning with reference to block 902.

Besides using identifier data space 506A to hold an identifier 506B such as a network address or similar, as is described above along with other implementations, identifier 506B of identifier data space 506A may alternatively or additionally include one or more other identifications. For example, identifier 506B may comprise information for signature cards, which enable the printing of legitimate negotiable instruments such as checks on printers having a proper and/or authentic signature card attached thereto. Thus, an identifier 506B may include signature identification, and identifier module 204 may comprise a signature card and/or a signature card function. In such an implementation, a printer (not shown) that is adapted to receive an identifier module 204 includes a disruptor apparatus 502. A printer that includes memory and provides a temporary or permanent storage function may be considered a storage system, and a printer may also access an identifier module 204 through a storage system 102 or other electronic device.

As another example, identifier 506B may comprise information for a licensing program whereby the indicia regarding which licenses are held by a user of a printer or storage system 102 are stored on an identifier module 204. A software application for a printer or storage system 102 can have a certain total number of modules/components from which a user may elect to secure licenses for only a limited subset thereof. The licensing indicia permit access to the limited subset and effectively exclude access to the remainder of the total number of modules/components. The software can also be licensed on an application by application basis, or any other programming unit granularity. Thus, an identifier 506B may include licensing identification, and identifier module 204 may comprise a licensing card and/or provide a licensing function. In this implementation, too, a printer that is adapted to receive the identifier module 204 includes a disrupter apparatus 502.

In cases where absolute uniqueness of an identifier 506B is not of paramount importance, the identification of identifier 506B as stored in identifier data space 506A may be provided to identifier module 204 prior to installation at a storage system or printer, such as upon manufacturing, sale, and/or initialization of the identifier module 204.

Although implementation(s) of apparatuses, methods, systems, and arrangements have been illustrated in the accompanying Drawings and described in the foregoing Detailed Description, it will be understood that the present invention is not limited to the implementation(s) explicitly disclosed, but is capable of numerous rearrangements modifications, substitutions, etc. without departing from the spirit and scope set forth and defined by the following claims.

What is claimed is:

1. An identifier module comprising:
   an identifier data space that is capable of receiving an identifier; and
   a breakable apparatus that is adapted to break and render the identifier module unusable upon removal of the identifier module from a storage system;
   wherein the identifier module is adapted for removable attachment to the storage system.

2. The identifier module of claim 1, wherein the identifier data space comprises a memory location.

3. The identifier module of claim 1, wherein the identifier data space comprises at least one of an alphanumeric identifier, a network address, and a node worldwide name (WWN) identity.

4. The identifier module of claim 1, wherein the identifier data space comprises at least one of licensing identification and signature identification.

5. The identifier module of claim 1, wherein the identifier data space comprises at least part of an integrated circuit (IC).

6. The identifier module of claim 1, wherein the identifier data space is further capable of providing the identifier after receiving the identifier.

7. The identifier module of claim 1, wherein the breakable apparatus comprises at least one of a printed circuit board (PCB) portion, a trace on a PCB, and an electronic component.

8. The identifier module of claim 1, wherein the identifier module is further adapted for removable attachment to the storage system at an interface that is associated with the storage system.

9. The identifier module of claim 1, wherein the identifier module is further adapted for removable attachment to the storage system at an interface that is associated with a memory unit of the storage system.

10. The identifier module of claim 1, wherein the identifier module is adapted for removable attachment to the storage system via at least one of insertion and securement.

11. The identifier module of claim 10, wherein the securement comprises at least one of a screw, a nut/bolt combination, and a latch.

12. The identifier module of claim 1, further comprising:
    an information parameters space that is capable of receiving one or more information parameters that correspond to at least one memory unit of the storage system.

13. The identifier module of claim 12, wherein the information parameters space and the identifier data space are located on a single electronic component.

14. The identifier module of claim 12, wherein the information parameters space and the identifier data space are located on different electronic components.

15. A storage system comprising:
one or more memory units that are capable of storing information; and
at least one interface that is adapted to receive an identifier module, the at least one interface including a disruptor apparatus that is adapted to break and render unusable the identifier module upon removal of the identifier module from the at least one interface.

16. The storage system of claim 15, wherein the storage system comprises a Fibre Channel storage system.

17. The storage system of claim 15, wherein the one or more memory units comprise one or more disk drives.

18. The storage system of claim 15, wherein the storage system comprises at least one configuration selected from the group comprising:
a configuration in which the one or more memory units comprise one memory unit and the at least one interface comprises one interface;
a configuration in which the one or more memory units comprise a plurality of memory units and the at least one interface comprises one interface; and
a configuration in which the one or more memory units comprise a plurality of memory units and the at least one interface comprises a plurality of interfaces.

19. The storage system of claim 15, further comprising:
at least one identifier module that is adapted for removable attachment to the at least one interface.

20. The storage system of claim 15, further comprising:
at least one identifier module that is adapted for removable attachment to the at least one interface, the at least one identifier module including a breakable apparatus that is adapted to break and render the at least one identifier module unusable upon removal of the at least one identifier module from the at least one interface.

21. The storage system of claim 15, further comprising:
at least one identifier module that is adapted for removable attachment to the at least one interface, the at least one identifier module including a breakable apparatus that is adapted to interact with the disrupter apparatus of the at least one interface.

22. The storage system of claim 15, further comprising:
at least one securement feature that is adapted to secure the identifier module to the at least one interface.

23. The storage system of claim 15, wherein the disruptor apparatus comprises at least one of a metallic arm, a flexible arm, a nonflexible arm, and a rotatable pawl.

24. The storage system of claim 15, wherein the at least one interface comprises at least one of a supporting feature and an insertion feature.

25. The storage system of claim 15, wherein the at least one interface is associated with at least one of the one or more memory units.

26. The storage system of claim 15, wherein the at least one interface is associated with the storage system.

27. A system comprising:
one or more memory units that are capable of storing information;
an identifier module, the identifier module including a breakable apparatus and an identifier data space that is capable of receiving an identifier; and
at least one interface that is capable of receiving the identifier module, the at least one interface including a disruptor apparatus that is adapted to break the breakable apparatus of the identifier module upon removal of the identifier module from the at least one interface;
wherein breaking the breakable apparatus renders the identifier module unusable.

28. The system of claim 27, wherein the system comprises a storage system.

29. The system of claim 27, wherein the system comprises an information processing system.

30. The system of claim 27, wherein the system comprises an information processing system that includes at least one of (i) a computer and (ii) one or more coupling mechanisms.

31. The system of claim 27, further comprising:
a plurality of identifier modules, each identifier module of the plurality of identifier modules including a breakable apparatus and an identifier data space that is capable of receiving an identifier.

32. The system of claim 27, wherein the identifier module is interfacing with the at least one interface; and wherein the identifier data space includes an identifier.

33. The system of claim 32, wherein the identifier comprises a node worldwide name (WWN).

34. An identifier module comprising:
an identifier data space that is capable of receiving an identifier; and
a breakable apparatus that is adapted to break and render the identifier data space inaccessible upon removal of the identifier module from an interface of a storage system.

35. The identifier module of claim 34, wherein the identifier data space is rendered inaccessible to the storage system through the interface after breakage of the breakable apparatus.

36. The identifier module of claim 35, wherein the identifier data space is still accessible through diagnostic equipment after breakage of the breakable apparatus.

37. The identifier module of claim 34, wherein the identifier data space comprises at least one of licensing identification and signature identification.

38. A storage system comprising:
one or more memory units that are capable of storing information; and
a disruptor apparatus that is adapted to break and render unusable an identifier module upon removal of the identifier module from the storage system.

39. The storage system of claim 38, wherein the disrupter apparatus comprises at least one of an arm and a pawl.

40. The storage system of claim 38, wherein the one or more memory units comprise a plurality of memory units; and wherein the storage system comprises a Fibre Channel storage system.

41. An identity arrangement comprising:
identifying means for holding an identifier; and
breakable means for breaking the identity arrangement upon removal of the identity arrangement from a storage system.

42. The identity arrangement of claim 41, wherein the identifying means comprises a memory location.

43. The identity arrangement of claim 41, wherein the identity arrangement is adapted for removable attachment to the storage system.

44. The identity arrangement of claim 41, wherein the breakable means comprises a mechanical breaking point that renders the identity arrangement unusable with the storage system upon breaking.

45. The identity arrangement of claim 41, wherein the breakable means comprises at least one of a printed circuit board (PCB) portion, a trace on a PCB, and an electronic component.

46. The identity arrangement of claim 41, wherein the identifier comprises at least one of an alphanumeric identifier, a network address, a node worldwide name (WWN) identity, licensing identification, and signature identification.

47. A storage arrangement comprising:
memory means for storing information; and
interface means for receiving an identifier module, the interface means including disruptor means for disrupting the functionality of the identifier module upon removal of the identifier module from the interface means.

48. The storage arrangement of claim 47, wherein the memory means comprises one or more disk drives.

49. The storage arrangement of claim 47, wherein the interface means comprises at least one of (i) insertion means for receiving the identifier module via insertion and (ii) supporting means for receiving and supporting the identifier module.

50. The storage arrangement of claim 47, wherein the disruptor means comprises at least one of (i) ripping means for ripping at least one of a trace, an electronic component, and a printed circuit board (PCB) portion of the identifier module and (ii) rotating means for damaging at least one of the trace, the electronic component, and the PCB portion of the identifier module.

51. A method for building an identifier module, the method comprising actions of:
constructing an identifier module having a breakable apparatus, the breakable apparatus designed to break upon extracting the identifier module from a storage system; and
adding an identifier data space to the identifier module.

52. The method of claim 51, wherein the actions of constructing and adding are performed at least partially simultaneously.

53. The method of claim 51, wherein the action of constructing comprises:
providing a printed circuit board (PCB); and
creating the breakable apparatus in conjunction with the PCB.

54. The method of claim 51, further comprising:
storing an identifier in the identifier data space.

55. The method of claim 54, wherein the action of storing comprises:
storing at least one of licensing identification and signature identification in the identifier data space.

56. A method for utilizing an identifier module, the method comprising actions of:
physically removing an identifier module from a storage system; and
automatically physically damaging the identifier module such that it becomes unusable during the action of physically removing the identifier module.

57. The method of claim 56, wherein the action of physically removing an identifier module comprises at least one action of:
de-inserting the identifier module from the storage system;
un-supporting the identifier module from the storage system; and
un-securing the identifier module from the storage system.

58. The method of claim 56, wherein the action of automatically physically damaging the identifier module comprises at least one action of:
damaging or disconnecting an electronic component;
damaging or dissecting a trace on a printed circuit board (PCB); and
damaging or destroying a portion of the PCB.

59. The method of claim 56, wherein the method is performed while the storage system is on-line.

60. A method for utilizing an identifier module, the method comprising actions of:
physically installing an identifier module to a storage system;
detecting a malfunction of the identifier module; and
automatically physically damaging the identifier module such that the identifier module becomes unusable with the storage system upon physically removing the identifier module from the storage system.

61. The method of claim 60, further comprising:
storing an identifier into an identifier data space of the identifier module; and
using the identifier for identification of at least part of the storage system in a network.

62. The method of claim 61, wherein the action of storing an identifier comprises:
storing a node worldwide name (WWN) identifier into the identifier data space of the identifier module.

63. The method of claim 60, wherein the method is performed while the storage system is on-line.

64. The method of claim 60, further comprising:
physically installing another identifier module to the storage system;
storing an identifier into an identifier data space of the another identifier module; and
using the identifier from the another identifier module for identification of at least part of the storage system in a network.

65. The method of claim 64, wherein the action of storing an identifier comprises:
transferring a copy of the identifier from an identifier data space of the identifier module to the identifier data space of the another identifier module.

* * * * *

UNITED STATES PATENT AND TRADEMARK OFFICE
CERTIFICATE OF CORRECTION

PATENT NO. : 7,085,857 B2  Page 1 of 1
APPLICATION NO. : 10/293449
DATED : August 1, 2006
INVENTOR(S) : Robert A. Rust et al.

It is certified that error appears in the above-identified patent and that said Letters Patent is hereby corrected as shown below:

In column 2, line 63, delete "Bluetooth A)" and insert -- Bluetooth ® --, therefor.

Signed and Sealed this

Fifth Day of May, 2009

JOHN DOLL
*Acting Director of the United States Patent and Trademark Office*